United States Patent [19]

Manuccia et al.

[11] 4,139,439
[45] Feb. 13, 1979

[54] HYDROGEN ISOTOPE SEPARATION

[75] Inventors: Thomas J. Manuccia, Laurel, Md.; Christine E. Geosling, Oakton, Va.

[73] Assignee: The United States of America as represented by the Secretary of the Navy, Washington, D.C.

[21] Appl. No.: 911,261

[22] Filed: May 31, 1978

[51] Int. Cl.$^2$ .................. C25B 1/00; B01K 1/00; B01D 59/00
[52] U.S. Cl. .................. 204/164; 204/165; 204/170; 423/648 A; 423/DIG. 7
[58] Field of Search .................. 204/165, 164, 170; 423/648 A, DIG. 7

[56] References Cited

U.S. PATENT DOCUMENTS

| | | | |
|---|---|---|---|
| 4,036,720 | 7/1977 | Clark et al. | 204/177 |
| 4,081,339 | 3/1978 | Benson | 204/158 R |
| 4,092,405 | 5/1978 | von Rosenberg et al. | 423/580 |

OTHER PUBLICATIONS

Basov et al., JETP Lett. 19(6), 190–191, Mar. 1974.

Primary Examiner—F.C. Edmundson
Attorney, Agent, or Firm—R. S. Sciascia; Philip Schneider; Thomas McDonnell

[57] ABSTRACT

A method of separating isotopes of hydrogen which comprises subjecting a mixture of methane and isotopes of hydrogen in a methane to hydrogen mole ratio from about 1000:1 to about 1:10 to a glow electrical discharge from about $10^{-3}$ to about 50eV per hydrogen bond at a temperature from about 50° K. to about 310° K. and at a pressure from about 0.3 Torr to the pressure at which arcing occurs.

12 Claims, 2 Drawing Figures

HYDROGEN ISOTOPE SEPARATION

BACKGROUND OF THE INVENTION

The present invention pertains generally to isotope separation and more particularly to non-laser separation of deuterium and tritium from hydrogen.

Isotope separation is becoming increasingly important as new uses are discovered for the less common isotopes and as the amount of nuclear wastes increases. Of particular interest is the separation of hydrogen isotopes. It is of great interest both from an enrichment point of view (heavy water production) and from a purification point of view (tritium removal from nuclear wastes). For proposed processes of separating deuterium, the main concern involves decreasing overall energy costs to the point where the new process becomes competitive with the current processes and eliminating the need for substances which are corrosive or toxic (such as $H_2S$ in the G.S. process) or expensive (such as catalysts in any of the other exchange processes). The concentration and removal of tritium from nuclear fuel cycle waste streams places stringent demands on proposed processes due to the problems associated with manipulation of radioactive materials. Such processes must have simple, small, and maintenance free equipment, have a large separation factor $\beta$, and remove tritium from the processed material rather than the light isotope, protium.

Recently a new technique for separating isotopes has been developed, which avoided many of the difficulties associated with currently used techniques, e.g. deadly and corrosive gases, scarce reactants, and high energy requirements. The technique utilizes a glow discharge to enhance the rates of isotopically selective chemical reactions at low temperatures. Without a glow discharge, the reaction would be too slow at the very low temperature necessary to obtain substantial isotope effects. Isotope separation is due to the dramatic increase of kinetic and equilibrium isotope effects. The translational temperature provides the enrichment conditions and the glow discharge provides the reaction rate for the enrichment process.

Basic to this method is the discovery of a reaction which produces reactive species whose net effect is a segregation of isotopes. Further, the energy requirements for the production of these species must be such that the process is self-sustaining or nearly so. Unfortunately, few reactions have these characteristics.

The published work in this area shows that reactions selected so far have a number of drawbacks. Basov and his colleagues reacted oxygen with nitrogen in order to separate nitrogen -15 from nitrogen -14. Their work was reported in Basov et al. *Isotope Separation in Chemical Reactions Occurring under Thermodynamic Nonequilibrium Conditions.* In JETP Lett. 19(6): p. 190-1, Mar. 20, 1974, and is Basov et al. *Kinetics of Nonequilibrium Chemical Reactions and Separation of Isotopes.* In Sov. Phys - Jetp 41(6): p. 1017-9, 1976. The reported yields have not been duplicated and the hypothesized mechanism has not been confirmed. Clark and Manuccia reacted hydrogen with nitrogen in order to separate hydrogen isotopes. This method has become the subject of U.S. Pat. No. 4,036,720. The disadvantages of this process is that the lightest isotope, protium, is withdrawn from the gases being processed and a condensation of the product occurs at the walls of the reactor which reduces the throughput and the energy efficiency of the process.

SUMMARY OF THE INVENTION

It, is therefore, an object of this invention to separate deuterium and tritium from protium without the use of toxic or corrosive or expensive reactants and without a large requirement of energy.

Another object is to separate isotopes of hydrogen by a continuous process scalable to commerical practicality. A further object of this invention is to separate isotopes of hydrogen by removing the heavier isotopes from the gas being processed.

A still further object is to separate hydrogen isotopes over long periods of time with little maintenance and little condensation or build-up on the walls of the equipment.

These and other objects are achieved by a gas-phase chemical exchange reaction of a mixture of hydrogen isotopes and methane under the nonequilibrium conditions present in a low-translational-temperature, glow electrical discharge whereby the heavier hydrogen isotopes displace protium in methane.

DETAILED DESCRIPTION OF THE INVENTION

Figure 1:
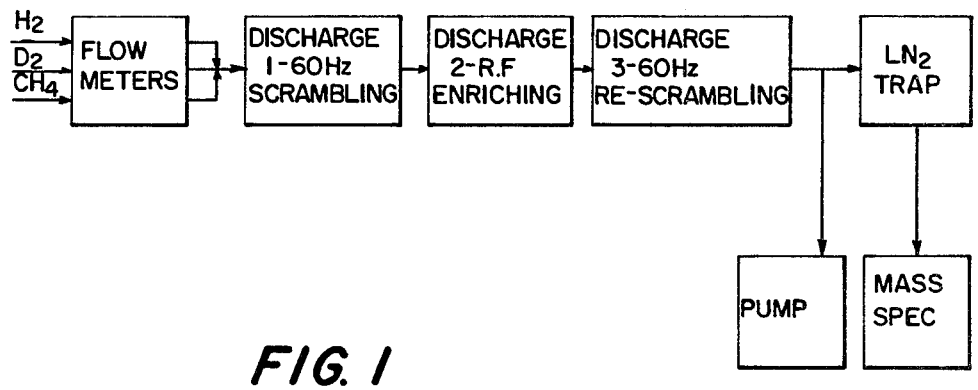
FIG. 1 is a schematic diagram of the apparatus used in the low-temperature glow-discharge experiments herein disclosed.

The stoichiometry of the exchange reaction is given by:

$$CH_4 + HD \rightleftharpoons CH_3D + H_2$$

for low system D/H ratios. This overall reaction comprises numerous elementary steps involving all of the molecules, vibrationally and electronically excited species, radicals and ions. Exemplary of the elementary steps involving neutral species that may occur in a self-sustained glow discharge are:

$$H_2 \xrightarrow{e^-} 2H, \tag{1}$$

$$CH_4 \xrightarrow{e^-} CH_3 + H, \tag{2}$$

$$H + CH_4 \rightarrow H_2 + CH_3, \tag{3}$$

$$CH_3 + H_2 \rightarrow CH_4 + H, \tag{4}$$

$$D + H_2 \rightarrow H + HD, \tag{5}$$

$$D + CH_4 \rightarrow H + CH_3D, \tag{6}$$

$$H + H + M \rightarrow H_2 + M, \tag{7}$$

$$CH_3 + H + M \rightarrow CH_4 + M, \tag{8}$$

$$CH_3 + CH_3 + M \rightarrow C_2H_6 + M, \tag{9}$$

All of the isotopic variants of Eqs. (1)–(9) may also occur. Reactions (1) and (2), involving energetic electrons, provide initial radicals for the chain mechanisms that follow. These include chain-propagating and isotope-scrambling reactions (3) and (4), atom-molecule isotope exchange [Eqs. (5) and (6)], and termination

[eqs. (7-9)], steps. A similar set of expressions can be written for ion-molecule reactions, and the importance of such reactions relative to neutral chemistry cannot be disregarded. Possibly present are very rapid, long-chain reaction processes which occur with ion-molecule reactions. Isotopic scrambling reactions (3)-(6), proceeding with activation energies of order 10 kcal, require much less energy than the initial bond-breaking processes (1) and (2). Thus, to the extent that these chain mechanisms are important, the less energy the overall isotopic enrichment process will require.

The above discussion is only a partial explanation of the complex chemistry of the present invention. It is given by way of a possible explanation of the present invention and is not intended to limit the invention to any specific theory. It should be noted that for any reaction scheme to be used in an isotope separation, these steps along with all of the excitation, transfer of excitation, deactivation, and reaction events occurring between the introduction of the reactants into the reactor and formation of the products must produce an accumulation of isotope effects which results in a segregation of isotopes. Unfortunately, such effects are not a priori predictable on account of the scant available published data in this area.

The glow electrical discharge may be either self-sustained or externally sustained. Externally sustained discharges are those involving the use of an external particle or radiation source which produces ionization in the reactor. The glow discharge may either be pulsed or constant. The duration, repetition, and intensity depend on the amount of reactants, the flow rate of the reactants in the reactor if the flow is continuous, the size of the reactor, and the desired temperature range. It is required that the discharge energy expenditure is sufficient to provide from about $10^{-3}$ to about 50 eV per hydrogen bond. This range represents the practical operating range. If the discharge energy is less than $10^{-3}$ per hydrogen bond, little reaction occurs and if the energy input exceeds 50 eV per per hydrogen bond, heating becomes a problem in undiluted mixture, synthesis of longer chain molecules begin to exceed tolerable limits, and the process would not be an economic improvement over exciting methods of isotope separation. The preferred range is from $10^{-2}$ to 30 eV per hydrogen bond, and the most preferred range is from $10^{-1}$ to 20 eV per hydrogen bond. Further, the glow discharge should not be of such duration and intensity that longer chain molecules are synthesized and that the gas temperature becomes too hot. The minimum power of discharge would be about one milliwatt per cubic centimeter. The maximum power is determined by the gas temperature in the usual application, but it is possible for it to be determined by the occurrance of longer chain hydrocarbons.

The amount of gases in the reactor is only dictated by economic consideration. To provide a uniform glow discharge throughout the reactor, the pressure would be approximately 0.3 Torr. The upper limit for the amount of gases would be determined by whether contraction of the electrical discharge into an arc occurs. If the discharge is self-sustained, the upper limit would be around 25 Torr. The precise upper limit would be determined by the strength and direction of the discharge, the temperature of the gases, and the amount and type of diluent gas and impurities. If the electrical discharge is externally sustained, the upper limit would be the pressure at which arcing occurs which would be about 2 to 3 atmospheres. The preferred pressure range is from 1 Torr to 20 Torr and the most preferred pressure is from 1 Torr to 10 Torr if the glow discharge is self-sustained. For externally sustained discharges, the preferred pressure range is from 1/10 to 2 atmospheres and the most preferred range is from ¼ to 1 atmosphere.

The exchanging gases may be mixed with a diluent gas, such as a noble gas mixture and provide slowing-down collisions for the rapidly moving electrons. The preferred gases are helium, and argon. Of course, any gas which conducts heat relatively well, does not attach electrons, and is not reactive may be used.

The exchanging gases are reacted in a H-M ($H_2$:$CH_4$) mole ratio from about 1000:1 to about 1:10, the point at which higher hydrocarbons are formed. Preferably the H-M mole ratio is from 100:1 to 10:1 and most preferably is from 60:1 to 20:1. If a diluent gas is included, the amount of the gas is at least greater than zero and preferably less than or equal to 70 moles per mole of exchanging gases and most preferably, the amount is less than or equal to 40 moles per mole of exchanging gases. There is no restriction on the relative amounts of the isotopes of hydrogen, Natural abundance of deuterium in hydrogen is 0.0156%. The proportion of deuterium or tritium could be higher or lower than natural abundance.

The present method is not dependent on any special purity of the gases. Commercial purity for the gases is sufficient for the practice of this invention. The temperature at which the isotope isolating exchange occurs is from about 50° K. to 310° K. Preferably the temperature is from 75° K. to 250° K. and most preferably it is from 125° K. to 190° K. A significant advantage of this invention is the segregation of isotopes at relatively high temperatures. In fact, the process is operable at temperatures above room temperature.

To more fully illustrate the practice of the present invention, the following examples are given. It is understood that these examples are given by way of illustration and are not meant to limit the specification or the claims.

EXAMPLE I

A schematic diagram of the equipment is given in FIG. 1. The equipment comprises three rotameter-type flow meters to monitor the incoming gases, a first cylindrical quartz tube with an o.d. of 1 cm. and a length of 15 cm, a second cylindrical quartz reactor with an o.d. of 1.6 cm and a length of 20 cm., a third cylindrical quartz reactor with an o.d. of 1.0 cm and a length of 15 cm, and a liquid nitrogen cold trap. These components are connected by one-centimeter-o.d. copper tubing. The first and third reactors are air cooled and the second reactor is cooled by submersion in a cold bath. A D.C. discharge was maintained in the first and third reactors by 60-Hz current from a 15-kV 60-mA self ballested transformers. The second discharge was driven by a rf power oscillator operating at approximately 30 MHz.

Procedure

Three discharges were used in sequence in a continuous-flow system operating at pressure near 1 Torr; two uncooled reference discharges (first and third) with a temperature of about 25° C., and the enriching (second) discharge, which was cooled by immersion in a bath of either liquid nitrogen or cooled isopentane. The first discharge was used to produce a scrambled equilibrium mixture of $H_2$, HD, $D_2$, $CH_4$, and several deuterated methanes from the incoming gases of hydrogen, deuterium, and methane. This mixture was then passed to the second discharge where deuterium atoms preferentially migrated from the molecular hydrogen to the methane and thus produced product methane enriched in deuterium. The third discharge was strictly for analytical purposes and was turned on to observe a rescrambling of the gas mixture. This procedure assured that the observed deuterium increase in the methane was an enrichment rather than an experimental artifact.

Throughputs of the order 2-6 moles of H atoms per day were used under normal operating conditions. The system pressure was measured just before the second discharge. For all experiments described herein, the flow conditions were such that following a step-function change in wall temperature, the average gas temperature readjusted in less than 1 cm in the flow direction. The wall temperature of the reactor was $-196°$ C. In the discharge itself, the translational temperature of the gas is greater than the wall temperature, with the maximum temperature found on axis. This self-heating effect can be small or large, depending on the rate of energy deposition. In the case of the cooled rf enriching discharge, the effects of self-heating were negligible under normal conditions. Self-heating would have manifested itself as a decrease in enrichment with rf-power input at high input levels. The enriching discharge was preceded and followed by ~30 cm of cooled reactor to precool the entering gas and provide a cool zone for any postdischarge reaction. Hydrogen, deuterium, and methane were of > 99% stated purity and were used as received.

Various experimental techniques were used to simplify interpretation of the data and to minimize possible experimental artifacts. For example, the gas flow was liquid-nitrogen trapped immediately prior to the mass-spectrometer entrance port. This eliminated any water or higher hydrocarbon fragment interference with the methane peaks of the mass spectrum. Water and hydrocarbon background in the mass spectrometer itself was minimized by liquid-nitrogen trapping of the diffusion pump on the instrument. The ionizing electron energy in the mass spectrometer was reduced to about 30 eV to minimize fragmentation of $CH_4$ which would tend to complicate mass spectral analysis. To measure isotope ratios, a two-channel boxcar integrator with an internal ratiometer was employed to sample average, and compute the ratio of any two selected mass peaks covered by the repetitive (20 sec $^{-1}$) mass scan. This ratio was then read from a digital display or recorded with a strip-chart recorder.

The enrichment data obtained from seven runs of the above experiment is given in TABLE I. In these runs, the reactant ratio, pressure, and flow rate were varied. This experiment is given and explained in more detail in Geosling, C. E., and Manuccia, T. J., *Enrichment of Hydrogen Isotopes Using the Low-Temperature Glow-Discharge Technique*. In Journal of Applied Physics 49(5), pp. 2605-10, May, 1978, which is herein incorporated by reference. Enrichment factor, $\beta$, is defined as:

$$\beta = \frac{[D/H(\text{enriched product})]}{[D/H(\text{total reagent})]}.$$

TABLE I

| Run | $H_2:D_2:CH_4$ | P(Torr) | Flow rate (cm$^3$/min) |
|---|---|---|---|
| 1 | $H_2\ D_2\ CH_4$ | 2.0 | 15 |
| 2 | 85:6:9 | 2.0 | 16.0 |
| 3 | 87:4:9 | 2.3 | 22.3 |
| 4 | 92:5:3 | 2.2 | 25.9 |
| 5 | 93:5:2 | 2.5 | 32.1 |
| 6 | 99:1:0.2 | 2.3 | 53.6 |
| 7 | 2:98:0.3 | 3.8 | — |

| Run | Energy required per H bond (eV) | Enrichment $\beta$ at -196° C. |
|---|---|---|
| 1 | — | 1.98 |
| 2 | 20.2 | 1.89 |
| 3 | 13.3 | 1.74 |
| 4 | 13.4 | 2.02 |
| 5 | 5.9 | 1.93 |
| 6 | 7.1 | 2.41 |
| 7 | — | 1.9 |

EXAMPLE II

Equipment

A schematic diagram of the equipment is given in FIG. 1. The equipment comprises three rotameter-type flow meters to monitor the incoming gases, a first cylindrical quartz tube with an o.d. of 1 cm. and a length of 15 cm, a second cylindrical quartz reactor with an o.d. of 1.6 cm and a length of 20 cm., a third cylindrical quartz reactor with an o.d. of 1.0 cm and a length of 15 cm, and a liquid nitrogen cold trap. These components are connected by one-centimeter -o.d. copper tubing. The first and third reactors are air cooled and the second reactor is cooled by submersion in a cold bath. A D.C. discharge is maintained in the first and third reactors by 60-Hz current from a 15-kV 60-mA self-ballested transformers. The second discharge is driven by a rf power oscillator operating at approximately 30 MHz.

Procedure

Figure 2:
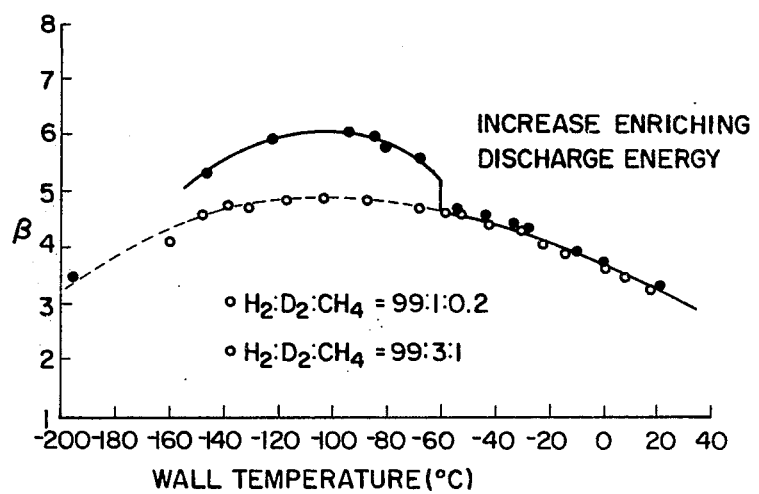
FIG. 2 is a graph of enrichment factor versus reaction temperature for hydrogen:deuterium:methane ratios of 99:1:0.2 and 96:3:1.

The same as Example I except that the pressure was 2 Torr and the flow rate was 59 cc/min. The temperature and reactant ratio were varied as was the discharge energy although not simultaneous. The discharge energy was increased from 25 watt until a significant enrichment was observed during the $H_2:D_2:CH_4 = 99:1:0.2$ run. The results in terms of enrichment factor are given FIG. 2. The results are given and explained in more detail in Manuccia, T. J. and Geosling, C. E., *Deuterium Isotope Enrichment in Methane-Hydrogen Mixtures Subjected to A Low-Temperature Glow Discharge*. In Applied Physics Letters 31(9): p. 575-7. Nov. 1, 1977, which is incorporated herein by reference.

The energy requirements and the separation factors indicate commercial feasibility for large scale deuterium enrichment. Since the reacted isotope is the one present in small quantities, this process also shows considerable promise for removing tritum from nuclear wastes.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of separating isotopes of hydrogen which comprises subjecting a mixture of methane and isotopes of hydrogen in a H-M mole ratio from about 1000:1 to about 1:10 to a glow electrical discharge from about $10^{-3}$ eV to about 50 eV per hydrogen bond at a temperature from about 50° K. to about 310° K. and at a pressure from about 0.3 Torr to about 25 Torr if said flow electrical discharge is self-sustained or to the pressure at which arcing ocurrs if said glow electrical discharge is external.

2. The method of claim 1 wherein a diluent gas which comprises a noble gas or a mixture thereof is included with said mixture of hydrogen isotopes and methane.

3. The method of claim 1 wherein said H-M mole ratio is from 100:1 to 10:1.

4. The method of claim 1 wherein said electrical glow discharge is from 1 eV to 30 eV per hydrogen bond.

5. The method of claim 4 wherein said temperature is from 75° K. to 250° K. and said pressure is from 1 Torr to 20 Torr if said discharge is self-sustained and is from 1/10 to 2 atmospheres if said discharge is external.

6. The method of claim 5 wherein said H-M mole ratio is from 100:1 to 10:1.

7. The method of claim 1 wherein said H-M mole ratio is from 60:1 to 20:1.

8. The method of claim 1 wherein said electrical glow discharge is from 4 eV to 20 eV per hydrogen bond.

9. The method of claim 4 wherein said temperature is from 125° K. to 190° K. and said pressure is from 1 Torr to 10 Torr if said discharge is self-sustained and is from ½ to 1 atmosphere if said discharge is external.

10. The method of claim 7 wherein said electrical discharge is from 4 eV to 20 eV, said temperature is from 125° K. to 190° K., said pressure is from 1 Torr to 10 Torr, and said electrical discharge is constant.

11. The method of claim 10 wherein said electrical discharge is pulsed and said pressure is from ½ to 1 atmospheres.

12. The method of claim 11 wherein said electrical discharge is constant.

* * * * *